United States Patent

Spencer et al.

[15] 3,688,215
[45] Aug. 29, 1972

[54] CONTINUOUS-WAVE CHEMICAL LASER

[72] Inventors: Donald J. Spencer, Torrance; Harold Mirels, Rolling Hills Estates; Theodore A. Jacobs, South Pasadena; Rolf W. F. Gross, Pacific Palisades, all of Calif.

[73] Assignee: The United States of America as represented by the Secretary of the Air Force

[22] Filed: Sept. 21, 1970

[21] Appl. No.: 73,820

[52] U.S. Cl. ................................. 331/94.5, 330/4.3
[51] Int. Cl. ............................. H01s 3/22, H01s 3/09
[58] Field of Search ....... 331/94.5; 330/4.3; 332/7.51

[56] References Cited

UNITED STATES PATENTS 3,560,876    2/1971    Airey ........................ 331/94.5

OTHER PUBLICATIONS

Gross, J. Chem. Physics, 50, 15 Feb 1969, pp 1889–90

Primary Examiner—Ronald L. Wibert
Assistant Examiner—R. J. Webster
Attorney—Harry A. Herbert, Jr. and William J. O'Brien

[57] ABSTRACT

This invention discloses a system for generating a continuous wave (CW) chemically pumped lasing action. A continuous radiation output is achieved by a technique which involves generation of a high speed jet containing a reactant and an inert diluent. A second reactant is diffused into the high speed jet. The chemical reaction between these reactants creates, directly, a vibrationally excited gaseous product with the requisite population inversion and lifetime needed for lasing. The vibrationally excited product gas is created within, or flows into, an optical cavity whose axis is transverse to the flow. Lasing is made to occur within the optical cavity. After lasing, the product gas is quickly convected out of the optical cavity by the high speed jet.

1 Claim, 7 Drawing Figures

Patented Aug. 29, 1972

INVENTORS.
DONALD J. SPENCER,
HAROLD MIRELS,
THEODORE A. JACOBS,
ROLF W. F. GROSS
BY Harry A. Herbert Jr
William J. O'Brien
ATTORNEYS (a) EFFECT OF VARYING $H_2$ (b) EFFECT OF VARYING $SF_6$ MASS FLOW, g/sec.

INVENTORS.
DONALD J. SPENCER,
HAROLD MIRELS,
THEODORE A. JACOBS,
ROLF W. F. GROSS
BY Harry C. Herbert Jr
William J. O'Brien and
ATTORNEYS INVENTORS
DONALD J. SPENCER,
HAROLD MIRELS,
THEODORE A. JACOBS,
BY ROLF W. F. GROSS Harry A. Herbert Jr. and
William J. O'Brien
ATTORNEYS

CONTINUOUS-WAVE CHEMICAL LASER

BACKGROUND OF THE INVENTION

The present invention relates to lasers. In a more particular aspect, the present invention concerns itself with a method and apparatus for generating a continuous wave, chemically pumped lasing action.

The generation and amplification of coherent electromagnetic radiation in the optical frequency range, generally referred to as lasing action, has evoked considerable interest in the communication and navigation disciplines. A number of systems have been evolved for creating a lasing action, especially of the continuous-wave type required for communication, navigation and heating applications. For example, various gaseous mediums such as carbon dioxide, nitrous oxide, a mixture of carbon dioxide and helium, and a mixture of carbon dioxide, helium and nitrogen are known for their lasing action. The requisite population inversion of these gases is accomplished by electric discharge.

In this invention, however, the requisite population inversion of the active gaseous medium is provided by a chemical reaction involving the diffusion of a first reactant material into a high speed flow containing a second reactant material. The two reactant materials react chemically to provide a sustained flow of a vibrationally excited molecular gas capable of lasing.

SUMMARY OF THE INVENTION

In accordance with this invention, a continuous-wave, chemically pumped lasing action is achieved through the medium of a chemical reaction. The technique involves flowing a supersonic jet containing atoms of one of the halogen elements, such as fluorine, and an inert gas into an ambient atmosphere of either hydrogen or deuterium. The fluorine atoms are obtained by mixing a fluorine compound with an inert gas which has been heated to a sufficiently high temperature to insure dissociation of the fluorine compound. Gaseous flow rates, temperatures and pressures within the heating region are controlled and adjusted to bring the inert gas-fluorine compound mixture to chemical equilibrium. The mixture is then allowed to expand and flow into the ambient atmosphere of hydrogen to effect a chemical reaction there between. The resultant reaction product HF, which is vibrationally excited, then flows into an optical laser cavity where lasing action takes place. The lasing action is of the continuous wave type and is capable of providing sustained laser power for arbitrarily long time durations. The laser is chemically pumped because the vibrational population inversion and radiation energy is provided directly by a chemical reaction.

The technique of this invention employs a continuous high speed flow system which provides freshly activated species in the optical cavity and at the same time provides for rapid removal of spent molecules. The diffusion of one reactant into a flow containing a second reactant allows for control of the region of reactant mixing and chemical reaction so that the reaction is confined to the region immediately adjacent to or within the optical laser cavity. The resultant chemical laser wavelengths find utility for application where continuous operation is necessary such as in laser communication, navigation and heating applications.

Accordingly, the primary object of this invention is to provide a method and apparatus for the production of a continuous-wave lasing action.

Another object of this invention is to provide a lasing medium wherein the requisite population inversion of the medium is accomplished directly by a chemical reaction.

Still another object of this invention is to provide a chemically pumped lasing system capable of producing a sustained laser power output over arbitrarily long periods of time.

The above and still other objects and advantages of the present invention will become more readily discernible after consideration of the following detailed description thereof when taken in conjunction with the accompanying drawings.

DESCRIPTION OF PREFERRED EMBODIMENT

The present invention provides a system for effecting a continuous-wave, chemically pumped lasing action. A sustained laser power is obtained directly from gaseous molecules that are vibrationally excited through a chemical reaction between a molecular gaseous reactant and fluorine atoms. Hydrogen or deuterium can be employed as the molecular gas component while the fluorine atoms are provided by fluorine-containing compounds such as $F_2$, $SF_6$, $NF_3$ or $F_2O$.

While this description is specific to the element fluorine, the invention is also capable of use employing the other halogens, namely, chlorine, bromine or iodine.

The chemical reaction takes place upon the diffusion of a gaseous reactant, such as hydrogen, into a jet stream of an inert diluent gas, such as nitrogen. The flowing inert gas, in turn, contains fluorine atoms. The fluorine atoms are obtained by heating a mixture of the inert gas and the fluorine compound. The gas flow, temperature, pressure and residence time in the heating region are controlled and adjusted to bring the inert diluent-fluorine compound gaseous mixture into chemical equilibrium and thereby bring about the dissociation of the fluorine compound to its atomic state. The fluorine atom containing gaseous mixture is then expanded to form a supersonic jet. The molecular gaseous reactant, such as hydrogen, is then diffused into the expanded jet flow mixture to effect a chemical reaction between the fluorine atoms and the hydrogen. This results in the generation of a vibrationally excited active gaseous medium which lases when allowed to flow through a suitable optical laser cavity. Any inert gas which does not enter into the reaction may be used as the diluent gas. Nitrogen and helium have been found to be most suitable.

Figure 1:
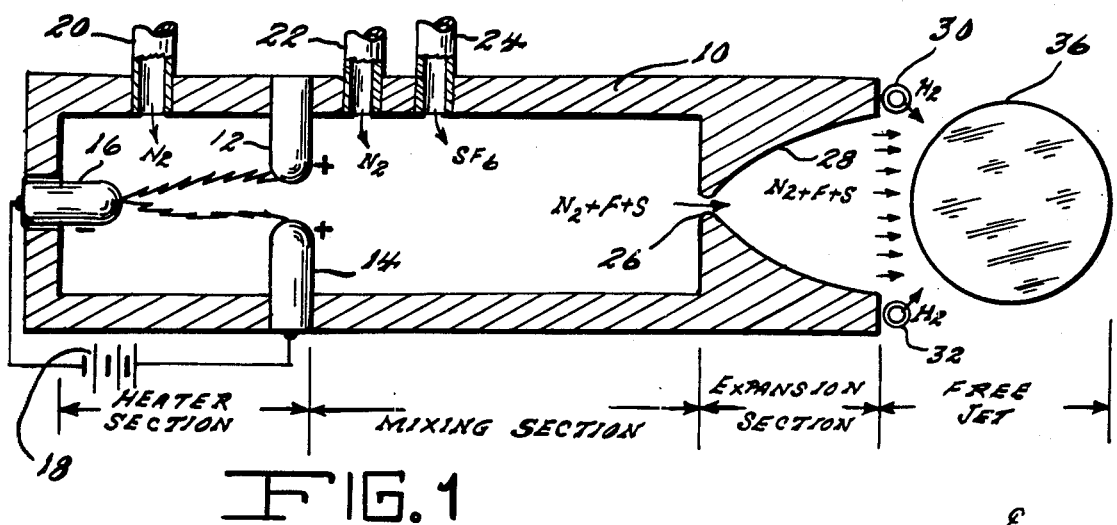
FIG. 1 represents a side view in schematic form of an apparatus suitable for use with the system of this invention.

Now referring to the drawings, wherein like elements in the several views are represented by like reference characters, there is shown in FIG. 1 a schematic illustration of a continuous-wave chemical laser according to this invention. The laser comprises a chamber, 10. The chamber 10, at one end, contains an arc heater having positive electrodes 12 and 14 and a negative electrode 16 connected to a suitable power source 18. Gas inlets 20 and 22 are provided for the introduction of an inert diluent gas while gas inlet 24 is provided for the introduction of a fluorine compound. The inert gas is heated to a desired temperature in that portion of the chamber 10 designated as the heater section. Dissociation of the fluorine compound to atomic fluorine takes place largely within that portion of the chamber 10 designated as the mixing section. The dilute fluorine atomic flow is then directed through a two-dimensional supersonic nozzle, 26 and 28, causing the gaseous mixture to expand as a supersonic jet of flowing gas. Two perforated tubes, 30 and 32, are positioned on each side of the nozzle exit 34 across the width of the jet stream, more clearly shown in FIG. 2. A reactant gas is injected through the tubes 30 and 32 into the flowing inert gas-fluorine atom containing jet stream. This provides an atmosphere adjacent to the jet stream boundaries that is rich in reactant gas. The reactant gas diffuses completely into the jet stream mixture and reacts chemically with the fluorine atoms to produce a vibrationally excited gas within an optical laser cavity defined by laser mirrors 36 and 38. The laser cavity is mounted transverse to the jet flow with the cavity centerline located about 1 to 5 inches downstream of the nozzle exit plane 34.

Figure 2:
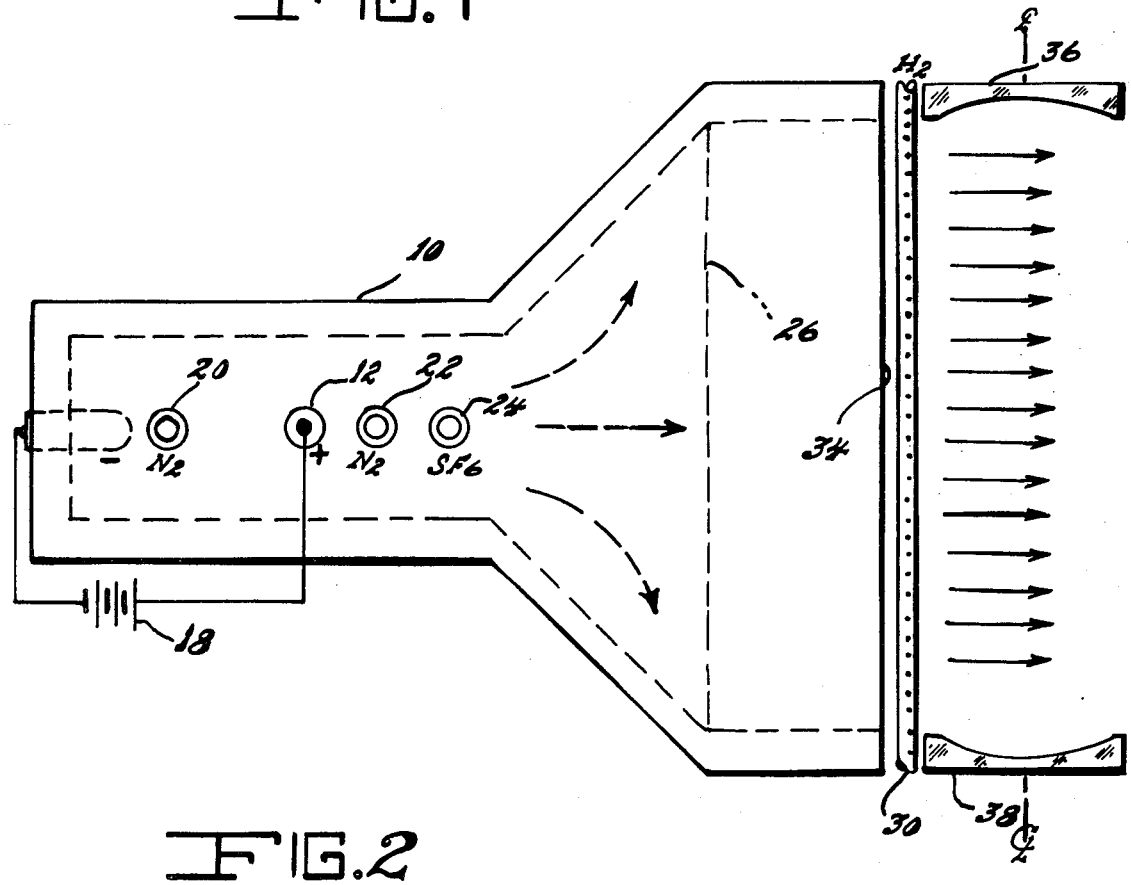
FIG. 2 represents a top view of the apparatus of FIG. 1.

In the operation of the apparatus of FIGS. 1 and 2, an inert gas, such as nitrogen, is introduced as a diluent through gas inlet 20 into chamber 10. An arc is struck in a conventional manner between electrodes 12, 14 and 16 in the heater section. The nitrogen diluent, at about one atmosphere, is heated by the electric arc to a high temperature of about 4,000° to 5,000° K. The hot diluent then flows into the mixing section where a fluorine compound, such as $SF_6$, is introduced into the flow through inlet tube 24. An additional amount of nitrogen diluent may be added to the mixing section through inlet 22, if desired. The flow rates and arc energy addition are adjusted so that the mixing temperature is sufficiently high to permit the total or partial dissociation of the $SF_6$ into atomic fluorine and sulfur.

The introduction of the $SF_6$ and the additional diluent brings the temperature in the mixing section to a level of about 2,000° to 3,000°K. The gas mixture now contains a dilute concentration of fluorine atoms and as it flows through the mixing section it starts to expand due to the configuration of the downstream end of the mixing section. Mixing continues to occur in this area so that the flowing mixture at the entrance to the supersonic nozzle 26 is well mixed and in equilibrium. The mixture is further expanded out the two dimensional nozzle 26 and exhausts from the nozzle as a free jet. The jet has a high velocity and is at a relatively low temperature and pressure. In the apparatus shown, the supersonic jet dimensions were three-eighths inches in height by 7 inches in width. A rapid expansion is needed in the supersonic nozzle in order to prevent recombination of the atomic fluorine during expansion.

A molecular gaseous reactant, such as hydrogen, is then injected into the jet stream from perforated tubes 30 and 32. This provides a hydrogen gas rich atmosphere adjacent to the boundaries of the jet stream. The hydrogen diffuses into the jet stream where it chemically reacts with the fluorine atoms to produce a vibrationally excited hydrogen fluoride gas. The excited gas then flows into the laser cavity, consisting of laser mirrors 36 and 38 where it lases. The optical laser cavity is established transverse of the jet flow with its center line located about 1 to 5 inches downstream of the nozzle exit plane 34. The optical cavity uses 2 inch diameter mirrors. Power coupling is made through a ⅛ inch diameter hole, not shown, centered in one of the mirrors. A InSb photo diode detector is used for signal detection and a narrow band IR filter provides spectral discrimination of the laser output. Laser action was proved by removing the rear optical cavity mirror for which case no signal could be detected.

Laser action was observed over a wide range of conditions. Mixing section temperatures ranged from 2,000° to 4,000°K. Free jet and cavity section pressures from 4 to 10 Torr., hydrogen injection rates from 0.05 mole/sec to 1 mole/sec, and $SF_6$ injection rates from 0.001 to 0.01 mole/sec, with $SF_6/N_2$ molar ratio of from 0.002 to 0.02. Typical operating conditions are tabuled in Table I for the configuration illustrated in FIGS. 1 and 2.

TABLE I

| | |
|---|---|
| Mixing section Pressure | 47 psia |
| Mixing section Temperature | 2000°K |
| Flow Mach No. | 4.3 |
| Laser cavity Pressure | 10 Torr |
| Molar Flow Rate $N_2$ | .54 moles/sec |
| Molar Flow Rate $SF_6$ | .0037 moles/sec |
| Molar Flow Rate $H_2$ | 1.0 moles/sec |

Figure 5:
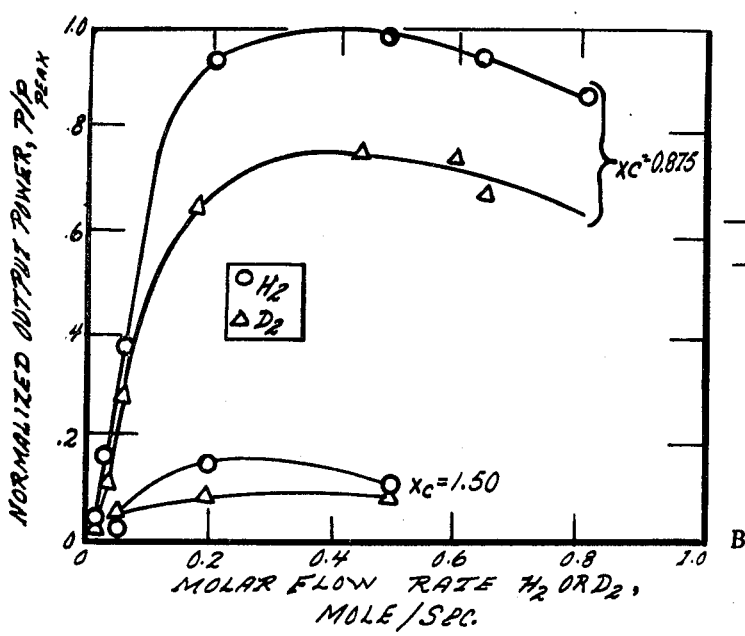
Figure 6:
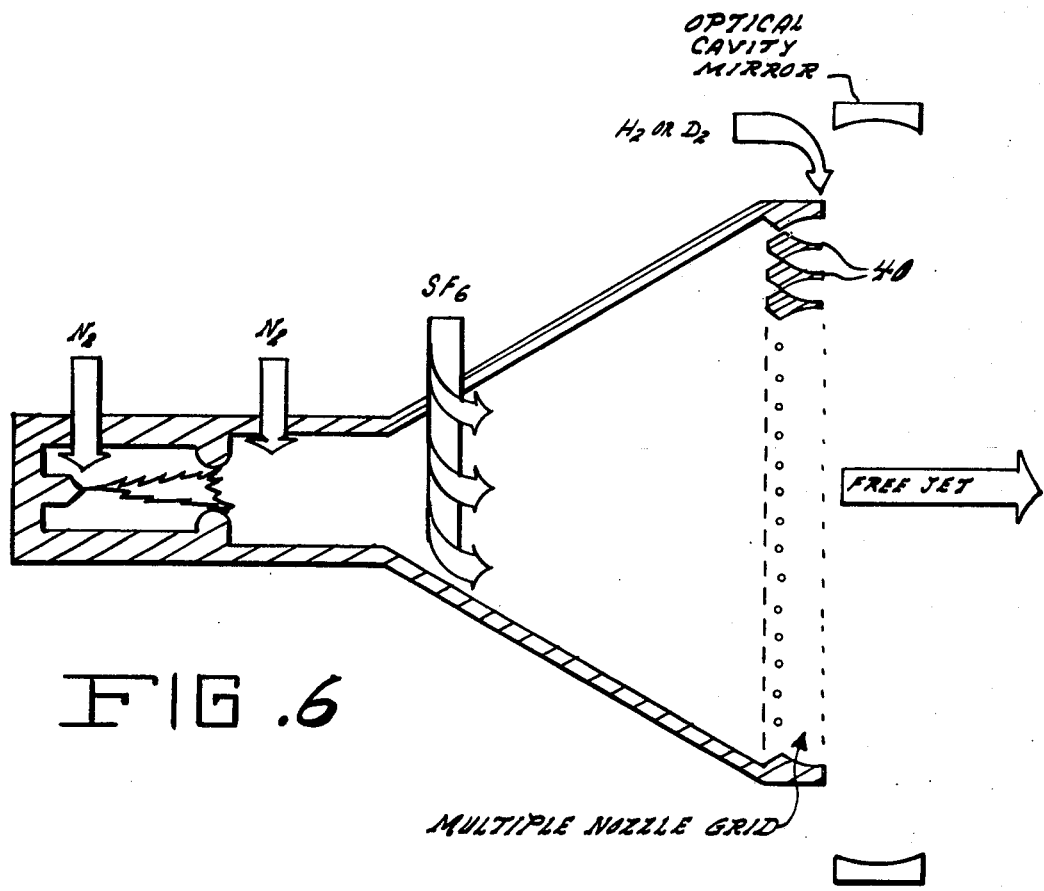
FIG. 6 represents an alternate form of the apparatus of FIG. 1.
Figure 7:
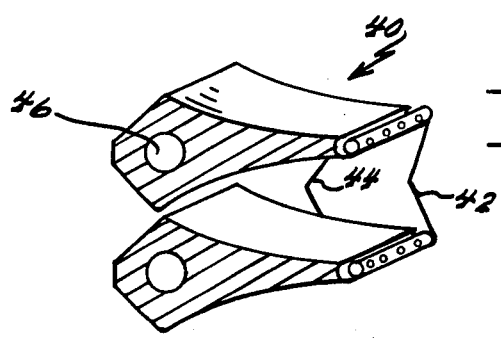
FIG. 7 is an enlarged view of the nozzle grid of FIG. 6.

Additional laser performance information has been obtained (see FIGS. 3, 4 and 5) using a multiple nozzle design illustrated in FIG. 6. In this form an array of nozzles 40 each comprising a transverse perforated tube 42 on a contoured vane 44, as shown in FIG. 7, is mounted across the nozzle exit. Adjacent contoured vanes 44 are spaced apart to permit the flow of the inert gas-fluorine mixture therethrough. Each contoured vane 44 may be provided with a passage 46 through which is flowed a coolant to maintain the bar at a low temperature. The advantage of this configuration is that each individual channel can be made as small as practical, to aid diffusion, while the overall exit area can be varied, at will, to obtain desired laser power levels and optical quantities.

Figure 3:
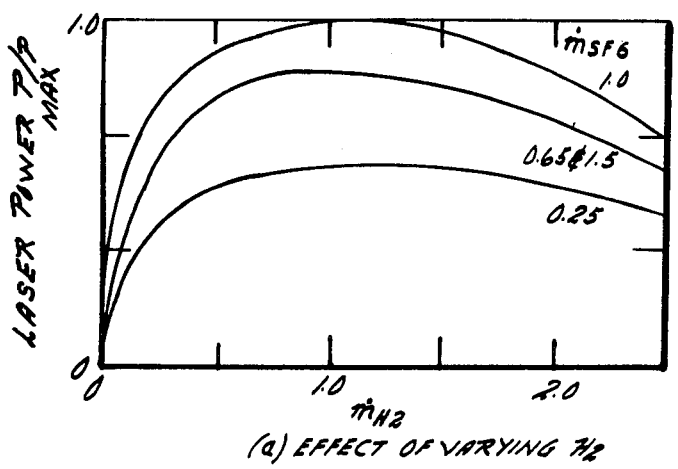
FIGS. 3, 4 and 5 are charts showing various normalized power outputs achieved by the system of this invention.
Figure 4:
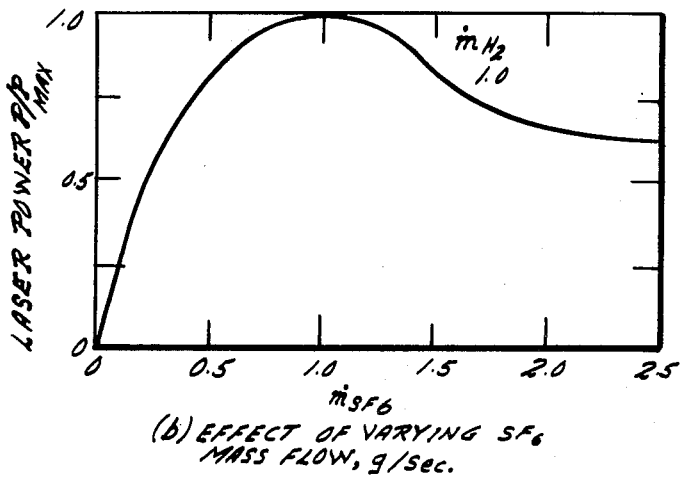

Using the form of the invention shown in FIG. 6 the $SF_6$ and $H_2$ mass flow rates were varied while the $N_2$ mass flow rate and the nominal arc power were held constant at 6.9 g/sec and 30 kW, respectively. The effect of varying $SF_6$ and $H_2$ mass flow rates on relative laser power output is illustrated in FIGS. 3 and 4. A fixed optical cavity was used. In these tests ($\dot{m}_{N_2} = 6.9$ g/sec and nominal arc power = 30 kW), the maximum laser power output occured at $\dot{m}_{H_2} = 1.0$ g/sec and $\dot{m}_{SF_6} = 1.0$ g/sec. Near maximum power, the output is less sensitive to variation in $\dot{m}_{H_2}$, as shown in FIG. 3, than to variations in $\dot{m}_{SF_6}$, as shown in FIG. 4. The laser power measurements were made by use of a pair of 2 inch diameter gold-plated, beryllium copper mirrors. One mirror had an optical radius of 240 in., and the other mirror was flat and had holes to permit extraction of laser power. The mirrors were placed 3 feet apart. The axis of the cavity was located seven-eighths inches downstream of the nozzle exit and was parallel to the 7 inch width of the jet.

At the maximum power point, the arc power input was 27.6 kW and the plenum pressure was 20.0 psi. Equilibrium calculations indicate that the mixing section temperature was 2,300° K, the molecular weight of the mixture was 28.0, and the ratio of specific heats was 1.42 (assuming chemical composition and vibrational energy remains frozen during the subsequent expansion). The area ratio for the expansion was 15.3. The free jet conditions before hydrogen injection were: Mach number, 4.5; temperature, 439° K; pressure, 3.75 mm, Hg; and velocity, $1.93 \times 10^5$ cm/sec. The atomic fluorine flow was computed to be 0.030 mole/sec. The flow rate of hydrogen at the peak power point was 0.50 mole/sec and therefore 16 times the fluorine molar flow rate. A hydrogen flow rate of 0.25 mole/sec results in a 10 percent reduction of peak power, see FIG. 3.

If all the atomic fluorine reacted with $H_2$ the total power generated would be 3.89 kW. Of this amount, 0.475 kW was extracted as laser power. Hence, the efficiency of the conversion of chemical to laser energy was 12 percent at the maximum power point. The chemical efficiency is higher for lower $SF_6$ mass flows (i.e., more dilute concentrations of F and lower net laser power out).

In operating the system of this invention, deuterium can be substituted for hydrogen as the gaseous reactant component. FIG. 5 shows the relative output power for the HF and DF continuous chemical lasers of this invention at various molar flow rates of $H_2$ and $D_2$ with $N_2$ as the diluent gas.

The vibrational population inversion required to produce a continuous HF chemical lasing action in accordance with this invention is illustrated by the following chemical reaction.

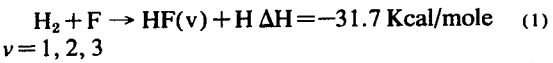

Deuterium, as pointed out heretofore, can be substituted for $H_2$ to produce a continuous DF chemical laser. Inversion is due to the reaction

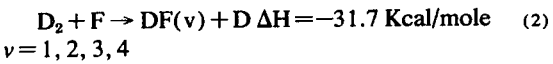

The HF chemical laser radiates at approximately $3\mu$ while the DF chemical laser radiates at approximately $4\mu$. To be more specific, spectroscopic observation has indicated that the major wavelengths lie between 2.6 and 2.9 and are due primarily to P branch transitions from the $v = 1, 2$ vibrational states for the HF laser. Zero power gain was determined to be 8 percent/cm. Peak power output was measured at 475 watts for an F atom flow rate of 0.030 moles/sec. Efficiency of conversion of chemical energy to laser energy was calculated to be 12 percent at the maximum power point.

The vibrational energy levels for DF($v$) are separated by 7 Kcal/mole. Hence, energy levels up to $v = 4$ can be populated by the reaction of equation (2).

However, it appears that the major lasing involves 2–1 and 1–0 transitions with relatively little laser output power from 3–2 transitions.

The results shown in FIG. 5 were obtained by operating the mixing section at fixed conditions and varying the $H_2$ or $D_2$ flow. The diluent was $N_2$. The ordinate is normalized with respect to the peak value of HF power output. Results are given for $x_c = 0.875$ in. which is optimum for power extraction. At $x_c = 0.875$ in., the ratio of DF to HF output power is approximately 0.7 at each value of molar flow of $D_2$ or $H_2$.

The present system has proved to be most efficient in producing chemically pumped laser power in the $3\mu$ to $4\mu$ radiation range through the effects of a chemical reaction. It provides a system for producing a sustained laser power source by converting chemical energy to laser energy at efficiency levels of from 8 percent for the DF laser to 12 percent for the HF laser. A peak power output of 630 watt was obtained with a fluorine atom flow rate of 0.040 mole/sec with the ratio of DF to HF laser power being 0.7 under similar flow conditions. Atomic fluorine flow rates of 0.030 moles/sec produced 475 watts of laser power.

Table II provides a further illustration of typical operating conditions for the system of this invention.

TABLE II

| Arc Heater | Mixer | Free Jet and Laser Cavity |
|---|---|---|
| $P_O = 25$ psia | $P_O = 25$ psia | $P_1 = 4.7$ torr |
| $T_O = 5500°K$ | $T_O = 2300°K$ | $T_s = 440°K$ |
| $\dot{m}_{N_2} = 4.5$ g/sec | $\dot{m}_{N_2} = 2.9$ g/sec | $\dot{m}_{H_2} = 1.0$ g/sec |
| Arc Power | | $V = 1.93 \times 10^5$ |
| $= 30$ kW | $\dot{m}_{SF_6} = 1.0$ g/sec | cm/sec |
| | | $M = 4.5$ |
| | | Jet $= 3/8 \times 7$ in |
| | | $\dot{m}_F = 0.030$ mole/sec |

A variety of alternate reactants and arrangements can be used. For example, the electric arc in FIGS. 1 and 2 can be used to dissociate $H_2$ to form H atoms in the mixing section of FIG. 1. Injection of $Cl_2$ through the perforated tubes (30 and 32 in FIG. 1) will result in a chemically pumped HCl laser due to the chemical reaction $H + Cl_2 \longrightarrow HCl(v) + Cl$. Other halogens or halogen compounds can be used to create other lasers (HI, HBr). These all lase in the infrared region.

Chain reactions can be used. Partly dissociated $F_2$, in the mixing section of FIG. 1, and $H_2$ injection through the perforated tubes, will result in a chain reaction

occuring in the free jet of FIG. 1. The chain reaction creates vibrationally excited HF which lases in the optical cavity of FIG. 1.

Alternate heating schemes can be used to obtain desired atomic species (such as F atoms) in the mixing chamber of FIG. 1. These include direct combustion, regenerative heating, electrical resistance heating and equivalents. For example, combustion of $D_2$ with an excess amount of $F_2$ will result in partly dissociated $F_2$ in the mixing section of FIG. 1. Expansion of this mixture to supersonic velocities, and diffusion of $H_2$ through the perforated tubes (FIG. 1), will result in an HF laser.

In addition, electrical discharges other than arcs (i.e., radio frequency discharges, glow discharges) can be used to provide atomic reactant species in the mixing chamber of FIG. 1.

While the invention has been described with particularity in reference to specific embodiments thereof, it is to be understood that the disclosure of the present invention is for the purpose of illustration only and is not intended to limit the invention in anyway, the scope of which is defined by the appended claims.

What is claimed is:

1. A system for generating a continuous wave of laser radiation comprising
a mixing chamber for gases;
a means for supplying a gaseous halogen compound into said mixing chamber;
a means for supplying a diluent gas into said mixing chamber, said diluent gas being inert relative to the halogen compound;
means for heating said diluent gas for effecting dissociation of the halogen compound in the mixing chamber to produce a gaseous mixture containing free halogen;
means for controlling and adjusting the heating region parameters to effect chemical equilibrium of said free halogen containing gaseous mixture
a plurality of side-by-side expansion nozzles each receiving and discharging a portion of the halogen and containing gaseous mixture inert diluent gases from the mixing chamber;
means for supplying a reactant gas into the freestream of gases discharging from each of said nozzles, the reactant gas and the halogen reacting to form an excited state specie emitting radiation upon relaxation from the excited state; and
optical apparatus extracting laser radiation from the excited specie upon relaxation.

* * * * *